United States Patent
De Oliveira Kastrup Pereira et al.

(10) Patent No.: US 6,721,884 B1
(45) Date of Patent: Apr. 13, 2004

(54) SYSTEM FOR EXECUTING COMPUTER PROGRAM USING A CONFIGURABLE FUNCTIONAL UNIT, INCLUDED IN A PROCESSOR, FOR EXECUTING CONFIGURABLE INSTRUCTIONS HAVING AN EFFECT THAT ARE REDEFINED AT RUN-TIME

(75) Inventors: Bernardo De Oliveira Kastrup Pereira, Eindhoven (NL); Adrianus J. Bink, Eindhoven (NL); Jan Hoogerbrugge, Eindhoven (NL)

(73) Assignee: Konklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/501,642

(22) Filed: Feb. 11, 2000

(30) Foreign Application Priority Data

Feb. 15, 1999 (EP) .............................. 99200431

(51) Int. Cl.[7] .................................. G06F 9/24
(52) U.S. Cl. .......................... 713/2; 713/100
(58) Field of Search .................. 713/1, 2, 100; 709/101; 712/10, 11, 12, 14, 15

(56) References Cited

U.S. PATENT DOCUMENTS

| 4,763,242 A | | 8/1988 | Lee et al. ............ 364/200 |
| 5,260,942 A | * | 11/1993 | Auerbach et al. ...... 370/474 |
| 5,684,980 A | | 11/1997 | Casselman ............ 395/500 |
| 5,748,979 A | | 5/1998 | Trimberger ........... 395/800 |
| 5,819,067 A | * | 10/1998 | Lynch ................. 703/22 |
| 5,892,961 A | * | 4/1999 | Trimberger ........... 712/10 |
| 5,943,501 A | * | 8/1999 | Burger et al. ........ 712/14 |
| 6,047,115 A | * | 4/2000 | Mohan et al. ......... 716/16 |

FOREIGN PATENT DOCUMENTS

JP       06004335 A  *  1/1994  ........... G06F/11/22

OTHER PUBLICATIONS

IBM Technical Disclosure Bulletin—"RISC Superscalar Workload Analysis Tool" —Apr. 1, 1994 –vol. 37, Issue 4B, pp. 51–52.*

* cited by examiner

Primary Examiner—Thomas Lee
Assistant Examiner—Thuan Du
(74) Attorney, Agent, or Firm—Mike J. Ure

(57) ABSTRACT

A processor contains a configurable functional unit that is capable of executing reconfigurable instructions, whose effect can be redefined at run-time by loading a configuration program. Reconfigurable instructions are selected in combinations of more than one different reconfigurable instruction. A respective configuration program is generated for each combination of instructions. Each time when an instruction from one of the combinations is needed during execution and the configurable functional unit is not configured with the configuration program for that combination, the configuration program for all of the instructions of that combination into the configurable functional unit. The reconfigurable instruction selects which instruction of the combination is executed.

20 Claims, 3 Drawing Sheets

SYSTEM FOR EXECUTING COMPUTER PROGRAM USING A CONFIGURABLE FUNCTIONAL UNIT, INCLUDED IN A PROCESSOR, FOR EXECUTING CONFIGURABLE INSTRUCTIONS HAVING AN EFFECT THAT ARE REDEFINED AT RUN-TIME

FIELD OF THE INVENTION

The invention relates to a method of executing a computer program with a processor that contains a configurable functional unit, capable of executing reconfigurable instructions, whose effect can be redefined at run-time. The invention also relates to a data processor for using such a method.

BACKGROUND AND SUMMARY OF THE INVENTION

A method of executing a computer program with a processor that contains a configurable functional unit is known from an article titled "DISC: The dynamic instruction set computer", by Michael J. Wirthlin and Brad L. Hutchings and published on pages 92 to 103 of the "Proceedings FPGAs for fast board development and reconfigurable computing" (Proceedings SPIE 2607), 1995, edited by John Schewel.

This article describes a data processor with a functional unit that contains a field programmable gate array (FPGA). The FPGA is a circuit that produces output signals as a function of input signals. The FPGA consists of a matrix of rows and columns of configurable circuit elements. The relation between input and output can be configured by loading information into memory cells that control connections between different circuit elements of the FPGA and the functions of those circuit elements.

The use of a configuration program should be distinguished from a microprogram. As is well known, a microprogram defines individual control signals that are used to control functional circuits. Different control signals are defined for different stages of microcode execution and for different instructions. In contrast, relevant memory cells that store bits of a configuration program have a permanent control over the input output relation, that is, they control circuit elements permanently, irrespective of the instruction that is being executed or any execution stage. Usually the controlled input output relation is a time continuous circuit property.

Configuration programs are derived for effecting different configurable instructions. According to the article by Wirthlin et al., the FPGA matrix is divided into a number of bands of rows of circuit elements. Each configuration program takes up no more than one band and may be placed in any band. At run-time, when a certain configurable instruction is encountered, it is tested whether the configuration program for this instruction has already been loaded into any one of the bands. If so, the instruction is executed using the configuration program. If not, the configuration program for that instruction is loaded and then the instruction is executed using the configuration program.

Only a limited number of configuration programs can be loaded at the same time. If there is no room for loading a new configuration program, the configuration program for another configurable instruction is removed from the band to make room for the new configuration program.

Each time a configuration program is loaded there is a considerable overhead. According to the article, this overhead is minimized by keeping the configuration programs loaded as long as possible before removing them to load other configuration programs. Thus, a kind of caching of configuration programs is realized, which minimizes the overhead when a configurable instruction is used repeatedly. Still, there is considerable overhead for loading configuration programs.

Amongst others, it is an object of the invention to reduce the overhead needed to load configuration programs. It is a further object of the invention to increase the number of configuration programs that can be kept loaded together, so that configuration programs need to be loaded at fewer times. It is another object of the invention to reduce the amount of memory needed to store all configuration programs needed for a computer program.

An embodiment of a method of executing a computer program involves a defining, and loading of configurable instructions in combination and not individually. Before running the program one or more combinations are selected, each of at least two configurable instructions. Typically, each combination is associated with one or more sequential regions of instructions the computer program. When the particular region of the program is executed, the configuration program for all configurable instructions for the relevant combination for that region is loaded.

The combinations of instructions and their associated regions can be selected before running the program, in such a way that the overhead for loading configuration programs will be minimal, that is, configurable instructions selected for the combination occur in a sequence without interruption by other configurable instructions, not belonging to the combination, if these other configurable instructions would cause the need to load another combination. Thus, the work done to minimize the overhead is done at compile-time rather than at run-time.

In addition, for many computer programs the instruction cycle count can be minimized with a combination of instructions that have strong similarities, such as use of bits from the same positions in the operands or the computation of similar but slightly different logic functions. These instructions can be realized with hardware resources that are used in common by all instructions in the combination plus some hardware resources that are particular to individual instructions (or subsets of the instructions). Thus, the number of instructions that can be loaded in the combination is increased.

According to a further embodiment of the method according to the invention, the configuration program for the combination of instructions is selected so that it cross-minimizes reconfigurable hardware resource use of different instructions in the combination in the reconfigurable functional unit. Cross-minimization of resource use for several functions means that the resource use is not minimized for the functions independently, but that a minimum is sought in the design space of all configuration programs that perform all functions. As a result of cross-minimization between the different instructions in the combination, fewer hardware resources are needed than would be needed for the combination if resource use were minimized for each instruction independently.

Examples of hardware resources in a configurable functional unit are circuit elements and programmable connections. A typical configurable functional unit contains a number of identical circuit elements with connections that can be configured to be on or off and that connect the circuit elements to each other, to other circuit types of circuit elements or to inputs or outputs of the functional unit. Typically only a limited number of such connections can be configured: for example only some circuit elements can be connected directly to inputs or outputs or to a given other circuit element.

If configuration programs are selected for different instructions independently, each configuration program for an instruction in a combination has to leave hardware resources free for use by other configuration programs for other instructions in the combination, even though these hardware resources may not actually be used. By cross-minimization, a configuration program for one instruction can use any hardware that is not used for other instructions.

Even worse, selection of a circuit element for use in the configuration program for one instruction without regard to the other instructions in the combination may cause additional resource use when this selection fixes the connections to the input or output. This eliminates the possibility of minimizing hardware resource use by optimally selecting input/output connections other instructions.

By cross-minimizing the use of hardware resources of the different instructions in the same combination such waste of hardware resources can be avoided. Furthermore, it is made possible to share common hardware resources between different instructions. By cross-minimizing hardware use it is avoided that the common hardware resources have to be allocated more than once for the combination of instructions.

According to a further embodiment of the method according to the invention, hardware resource use for selecting different instructions in the combination and for processing operand data according to said different instructions is cross-minimized. Conventionally, instruction selection involves decoding the opcode into signals that enable operand data processing circuits. In the embodiment, fewer hardware resources are needed for instruction selection and operand data processing together than if hardware resource use of the configuration program for instruction and operand data processing were minimized independently of one another.

Preferably, the processor is pipelined. This means that instruction processing is split in successive stages, such as an instruction decoding plus operand fetch stage, an instruction execution stage and a result write back stage. In a pipelined processor different stages of instruction processing of successive instructions are executed in parallel with each other. The configurable part of instruction processing takes place at the execution stage. According to an embodiment of the invention both operand data processing and use of instruction selection bits to distinguish between different instructions takes place at the execution stage of processing the configurable instruction.

According to a further embodiment of the method according to the invention, the reconfigurable functional unit contains a reconfigurable cross-point switch between an input for operand data and connection lines that connect respective outputs of the cross-point switch to different logical combination circuits.

BRIEF DESCRIPTION OF THE DRAWINGS

Various aspects of the invention will be described using the following figures.

DETAILED DESCRIPTION OF THE PRESENTLY PREFERRED EMBODIMENTS

Figure 1:
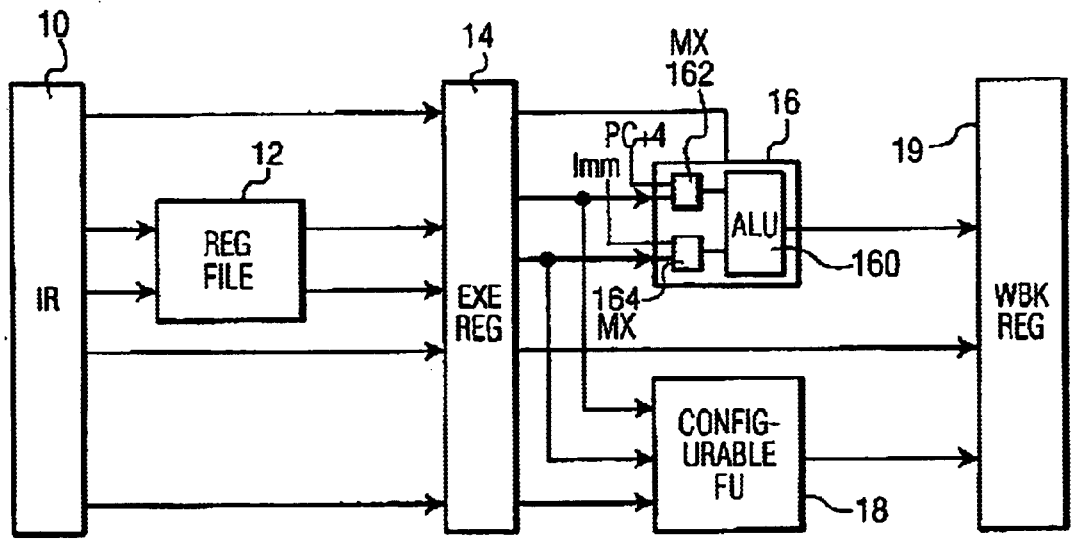
FIG. 1 shows a processor architecture that supports configurable instructions.

FIG. 1 shows an embodiment of a processor architecture that supports configurable instructions. Note that various aspects of this processor architecture that do not affect the invention have been left out in FIG. 1 for the sake of clarity. By way of example a pipelined RSIC architecture is considered, but the invention is not limited to such an architecture. For example, a CISC architecture or a DSP architecture may be used instead. The embodiment shows a pipelined processor, with three registers 10, 14, 19, that separate different pipeline stages. An instruction register 10 is at the source of the pipeline. Operand reference field outputs of this instruction register 10 are coupled to inputs of a register file 12 (by way of example these fields are five bits wide). The outputs (w bits wide; e.g., w=32) of this register file 12 are coupled to an execution stage register 14, together with further outputs of the instruction register 10. The further outputs include a result address output (5 bits wide by way of example) and a an output for configurable instruction selection code (11 bits wide by way of example).

Outputs of the execution stage register 14 that pass data from the register file 12 are coupled in parallel to an ALU functional unit 16 and a configurable functional unit 18. The ALU functional unit 16 contains an ALU 160, whose inputs are coupled to respective multiplexers 162, 164. Each multiplexer 162, 164 has an input coupled to the outputs of the execution stage register 14. The multiplexers 162, 164 furthermore have an input receiving the program counter value and an immediate value from the instruction register respectively (connections for this input are not shown).

Further outputs of the execution stage register 14 pass the configurable instruction selection code to the configurable functional unit 18 and the result address is passed to a writeback stage register 19. Outputs of the ALU functional unit 16 and the configurable functional unit 18 are connected to the writeback stage register 19. The execution stage register 14 has a connection (not shown) to the register file 12 for writing the results of the ALU functional unit 16 or the configurable functional unit 18 into the register file 12 at the location indicated by the result operand address.

Various circuits, such as further functional units (e.g., a memory access unit) control lines, branching circuits, instruction decoding circuits and multiplexers to select inputs for the registers 14, 19 etc., have been left out in FIG. 1 for the sake of clarity.

In operation, the architecture of FIG. 1 implements a pipelined execution mechanism. Successive instructions are loaded into the instruction register 10 in successive clock cycles. In the clock cycle after an instruction is loaded, its operand references are used to load the operands from the register file 12. This clock cycle may also contain instruction decoding, for example selection which of the functional units 16, 18 (or others not shown) will executed the instruction. At the end of this clock cycle the operands, the result operand address and the configurable instruction selection code are loaded into the execution stage register 14 together with any other data (not shown) that is needed for execution. In the next clock cycle, this information is passed to the functional units 16, 18 (and/or other functional units not shown) and processed in order to obtain a result. At the end of this next clock cycle the result from the selected functional unit 16, 18 and the result operand address are loaded into the writeback stage register 19. In the clock cycle after this next cycle, the result is written back into the register file 12.

If the opcode field of the instruction selects a configurable instruction, the configurable function execution unit 18 is selected to execute the instruction and to produce the result. In this case, the configurable instruction selection code in the instruction is used to determine which particular configurable instruction is executed.

Of course, without deviating from the invention, more than one configurable functional unit may be provided in parallel, each configured with a different combination of instructions so that more than one combination is available at the same time, without overhead for exchanging the required configuration programs.

Figure 2:
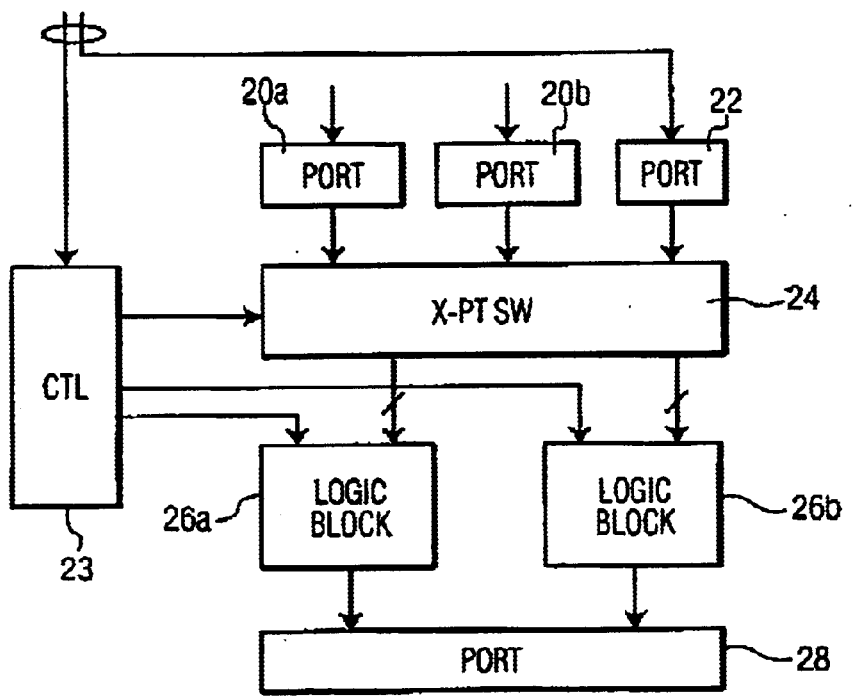
FIG. 2 shows a configurable functional unit.

FIG. 2 shows an embodiment of a configurable functional unit. This is basically a CPLD (Complex Programmable Logic Device) core, which is known per se. The configurable functional unit has input ports 20a,b 22, for receiving the w bits of each of the operands and N bits of the configurable instruction selection code (N=4 by way of example). The input ports are connected to inputs of a cross-point switch 24. This cross-point switch 24 has a number of outputs. The cross-point switch 24 is designed so that each of its 2*w+N inputs can be connected to any one of the outputs under control of a configuration program that is loaded in the configurable functional unit.

The outputs of the cross-point switch 24 are connected to respective logic blocks 26a–b. Outputs of the logic blocks 26a–b are coupled to an output port of the configurable functional unit. By way of example, two logic blocks 26a–b are shown, each with 36 inputs and w/2 (e.g., 16) outputs. The w/2 bit outputs of the two logic blocks 26a–b together make up a w (e.g., 32) bit result output.

The configurable functional unit contains a reconfiguration control circuit 23. This reconfiguration control circuit 23 contains an input, which receives those bits of the configurable instruction selection code that are not supplied to the cross-point switch 24. The reconfiguration control circuit 23 has outputs connected to the cross-point switch 24 and the logic blocks 26a,b.

In operation, the reconfiguration control circuit 23 compares the received bits of the instruction selection code and compares those bits with the corresponding bits of the combination of reconfigurable instructions that the configurable functional unit is currently programmed to execute. Preferably, a subset of the bits of the instruction selection code is used to indicate the combination, the remaining bits indicating the configurable instruction within the combination. If the selection code indicates that an instruction from a different combination should be executed, the reconfiguration control circuit 23 loads the configuration program for all of the instructions of the new combination from a memory (not shown) and reprograms the cross-point switch 23 and the logic blocks 26a,b as required for that new combination. Subsequently, the instructions from that new combination may be executed.

Once the new combination is loaded or when an instruction is selected from a combination that is already loaded, the configurable functional unit processes that instruction. In this case, the N instruction bits that are applied to the cross-point switch determine according to which instruction (from the combination of instructions that is loaded into the configurable functional unit) the operands are processed.

The easiest implementation of loading the configuration program involves stalling further instruction execution by the processor until the configuration program is loaded. However, alternative implementations may be used, which require less instruction cycle overhead. For example, a precursor instruction may be used to trigger a load of the configuration program. The precursor instruction indicates that configurable instructions from the combination will be used. The precursor instruction itself does not require the configuration program, but it triggers loading of an indicated configuration program.

In another example the processor jumps to a subroutine of normal (e.g., ALU) instructions, which execute the configurable instruction in case the configuration program is to be loaded or is being loaded. This may be implemented by putting the content of the addressed operands registers on a subroutine call stack, calling the subroutine and returning a result from the call stack to the addressed result register of the configurable instruction after return from subroutine.

Figure 3:
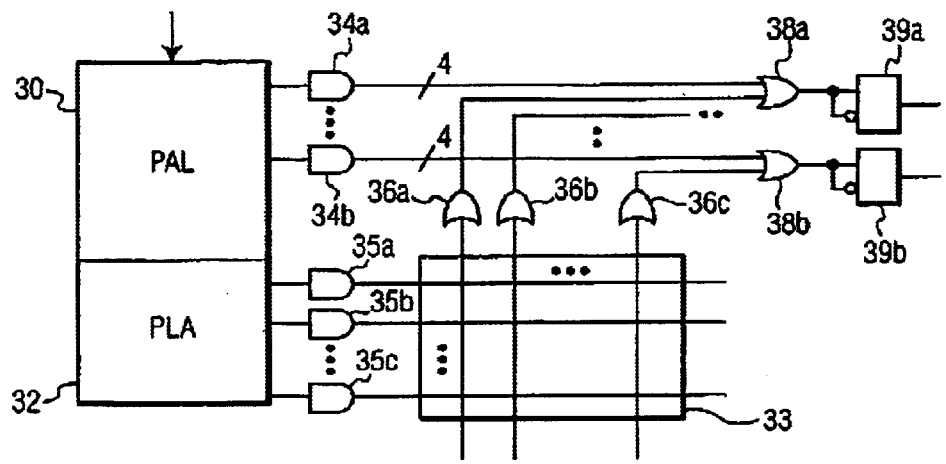
FIG. 3 shows a configurable logic block.

FIG. 3 shows an embodiment of an example of logic block for use in the configurable functional unit of FIG. 2 (also known per se from CPLD's). This logic block contains a PAL array 30 and a PLA array 32, both coupled to all of the outputs of the cross-point switch 24. At the outputs of the arrays 30, 32 AND gates 34a–b, 35a–c are shown symbolically. By way of example, there are 64 AND gates 34a–b for the PAL array 30 and 32 AND gates 35a–c for the PLA array 32.

The arrays 30, 32 are made up column conductors and row conductors (not shown), each column corresponding to a respective output of the cross-point switch 24 (preferably, there are columns both for signals and their negations), each row corresponding to AND gate 34a–b, 35a–c of the logic block. At the cross-points of rows and columns are transistors and memory cells (not shown). The memory cells control whether the transistors are activated; the transistors, when activated, form inputs of the AND gates 34a–b, 35a–c: the AND gates 34a–b, 35a–c output the AND of the logic level of those column conductors whose transistors are activated.

The outputs of the AND gates 35a–c of the PLA array are connected to row conductors of a matrix 33. Column conductors of this matrix are shown connected to OR-gates 36a–c. At the cross-points of rows and columns are transistors and memory cells (not shown). The memory cells control whether the transistors are activated; the transistors, when activated, form inputs of the OR-gates 36a–c: the OR gates 36a–c output the OR of the logic level of those row conductors whose transistors are activated.

The outputs of the PAL array 30 are connected in groups of four to further OR gates 38a–d. Each OR gate 36a–d has an output coupled to an input of a respective one of the further OR-gates 38a–b. By way of example, there are 16 OR-gates 36a–d and 16 further OR-gates 38a–b. Each further OR gate 38a–b is connected to an output bit line of the logic block via a programmable inverter/non-inverter 39a–b. A memory cell (not shown) is provided for each inverter/non-inverter 39a–b the content of these memory cells controls whether theses inverter/non-inverters 39a–b invert or not.

The logic function of the logic block is programmed by loading bits of a configuration program into the memory cells that control the activation of the transistors at the cross-points in the PAL matrix 30, the PLA matrix 32, the matrix 33 and the function of the inverters/non-inverters 39a–b.

N bits of the instruction selection code are applied to the cross-point switch 24. These N bits are applied in the same way as the bits of the operands. The configuration program of the configurable functional unit has the freedom to treat these N bits just like any of the operand bits. It is not necessary that the N bits are first combined to detect a specific one of the instructions, the detection result being used to control how data is processed. On the contrary, individual bits of the N bits can participate as arguments in logic functions with operand bits, independent of the other bits of the N bits.

Figure 5:
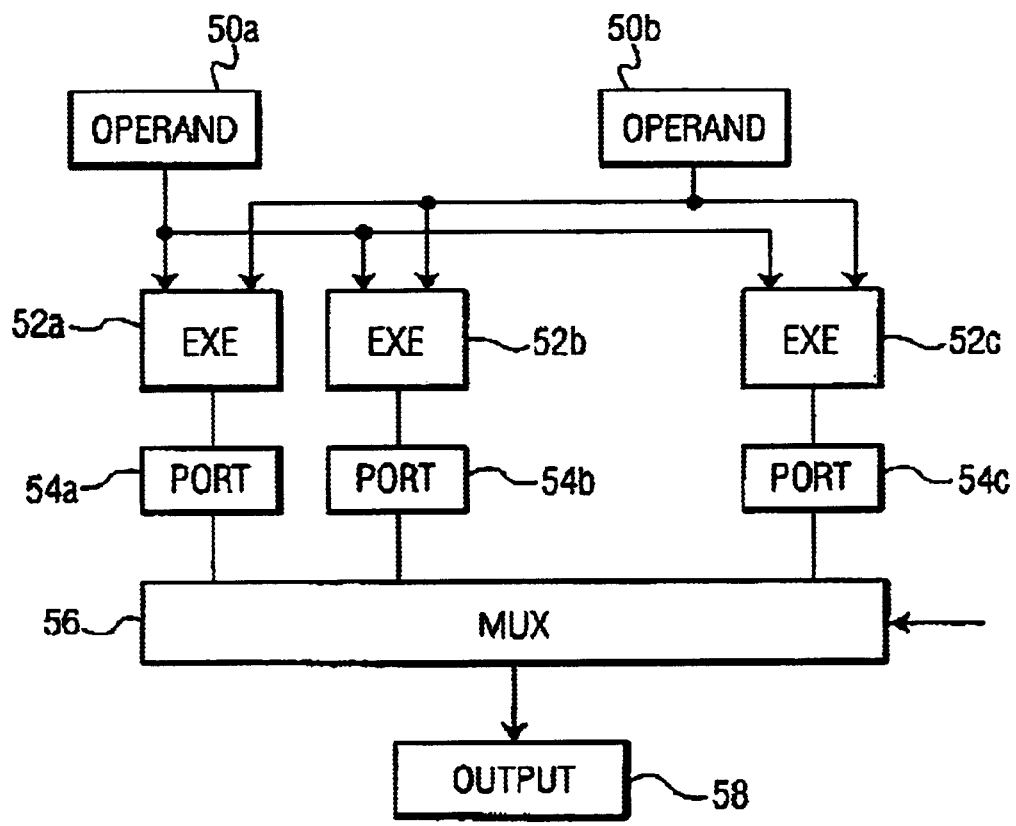
FIG. 5 shows a model of a functional unit for executing a combination of instructions.

FIG. 5 shows a model of the hardware function description of the functional unit, when programmed to execute instructions from a combination of instructions. Note that the structure shown in this description is functional only and not physical. The separation into different functional blocks need not correspond to any separation of the structure of the circuit implemented in the configurable functional unit and different blocks may share the same physical circuit elements in the configurable functional unit.

The model shows inputs 50a,b for two source operands, a number of blocks 52a–c for executing respective ones of the configurable instructions, ports 54a–c for the results of these instructions, a multiplexer 56 for passing one of the results to an output 58. The multiplexer 56 is controlled by N bits of the instruction selection code.

This model will be converted to a list of connections that has to be made to implement its function. During this conversion, resource use will be cross-minimized between the various blocks of FIG. 5: the function of the multiplexer 56 may be merged (partly) with that of the blocks 52a–c and the functions of those blocks 52a–c may be merged with one another.

The configurable instructions and the combinations of those instructions that are loaded together are preferably selected independently for each specific program that runs on the processor. In the following these instructions and combinations will also be called "custom instructions" and "clusters" respectively. Selection of custom instructions and clusters preferably takes place with compilation of a computer program, that is, before the processor runs the computer program.

Figure 4:
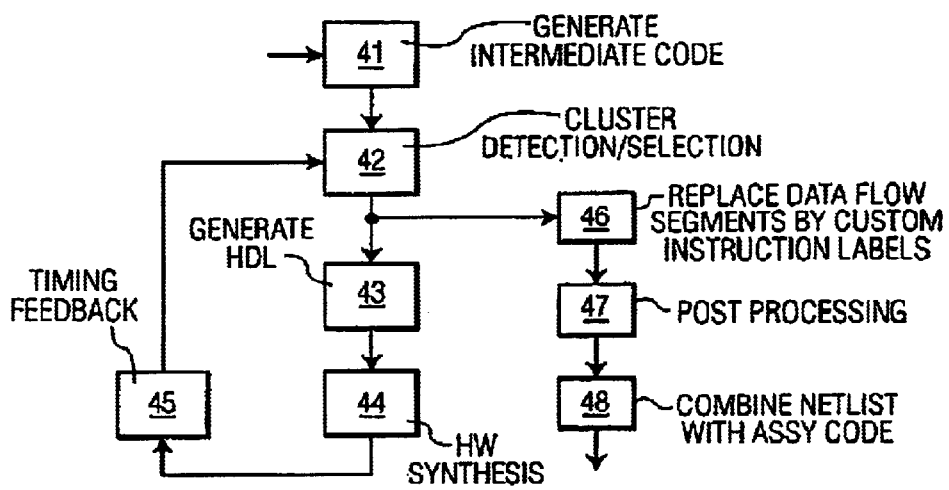
FIG. 4 shows a flow chart for generating a compiled program.

FIG. 4 shows a flow chart for generating a compiled program. The flow chart of FIG. 4 performs the following steps:

41. Source code (typically written in C) is processed by a compiler front-end, generating intermediate code represented as a data-flow graph;
42. The intermediate code is read by a Cluster detection/selection module, which looks for data-flow segments potentially suitable for hardware synthesis (candidates). Each "candidate" defines a custom instruction. Preferably only segments made of purely arithmetic or logic operations within the critical paths of the application are considered. Profile data is used to guide the search. Candidates are grouped together in clusters of custom instructions according to certain criteria (see the discussion hereinbelow);
43. The clusters are processed by a translator, which converts the arithmetic operations of data-flow segments into a hardware description in HDL (a standard Hardware Definition Language). Decoding logic is added in this hardware description, such that the different custom instructions may be executed independently. FIG. 5 shows an example of a model of the circuit description produced at this stage.
44. The resulting circuit description is processed by a hardware synthesis tool where timing and fitting reports are generated (describing the required amount of processing time and hardware), as well as a circuit netlist. At this stage the function of the multiplexer in the circuit description may be cross-minimized with resource use of the function blocks of FIG. 5. This cross-minimization of resource is known per se for programming programmable logic with functions in general.
45. Timing and fitting information is sent back to the Cluster detection/selection module, where clusters may be re-arranged or discarded, or new clusters formed. The cycle continues until a final set of clusters is selected.
46. When the final set of clusters has been selected, the data-flow segments in the intermediate code that are implemented in the finally selected clusters are replaced by their equivalent custom instruction labels.
47. The resulting code is then post-processed (for register allocation, assembly code emission, instruction scheduling, and/or any other post-processing that may apply) by a back-end.
48. The resulting assembly is sent to a modified assembler that recognizes the newly synthesized custom instruction labels. The netlist generated by the hardware synthesis tool is combined with the assembly, producing the final executable.

The hardware synthesis steps can be completely hidden from the human programmer. Alternatively, one may require the human programmer to select the candidates and/or clusters manually, preferably using the guidelines described hereinabove.

Selection of candidate configurable instructions from the data-flow graph of a program is known per se. Basically this involves selecting subgraphs from the data-flow graph of the program, where the subgraphs have no more than two variable operand inputs. (This is in case the configurable functional unit has two operand inputs. If the configurable functional unit has a smaller or larger number of operand inputs, subgraphs with correspondingly larger or smaller inputs may be selected).

Preferably, candidates are grouped in clusters on the basis of regions of sequential instructions in the program where the candidates occur. No more clusters should be defined for a region than the number of configuration programs that can be loaded at the same time (e.g. only one cluster if there is only one configurable functional unit and it can be configured with only one configuration program at a time). The size of the program region and the number of candidates selected for that region should be chosen so that all candidates can be programmed in the maximum number of simultaneously loaded clusters.

In principle, both the selection of candidate instructions and their combination into clusters is a constrained optimization problem. There is a number of sets of possible combinations of configurable instructions. The aim is to find a set which minimizes the number of instruction cycles needed for a typical execution of the program (as defined by an execution profile). The minimization of the instruction cycle count is under the constraint that all selected candidates for a cluster fit into the configuration program.

For this purpose one considers configurable instructions that each produce an effect in one instruction cycle that would require a larger number of instruction cycles if only normal instructions were used. The number of additional instruction cycles needed for executing all normal instructions in the profile that are to be replaced by custom instructions should be larger than the overhead cycles for loading configuration programs. Otherwise, no combination should be selected. Note that the number of overhead cycles is smaller for loading a combination than for loading the same number of instructions individually because loading needs to take place once for all instructions in the combination and on average takes less configuration program space per instruction because of cross-minimization.

The number of candidates that can be combined in a cluster may depend on the minimization of resource use in the configurable functional unit: the "smaller" the configurable instructions or the more highly similar, the more configurable instructions can be combined into one cluster.

An example of an algorithm to select clusters is

1) Select a region from an area of the program, in terms of a starting instruction and an end instruction of the region in the intermediate code produced by the compiler. Preferably, one should select the instructions in frequently executed loops as a region, or in frequently executed subroutines, but regions that are not executed very frequently but contain repetitions of similar instructions are also good candidates.
2) Select a number of candidate custom instructions for data flow segments for instructions in the selected region.
3) Determine whether a configuration program can be generated for a cluster combining the selected custom instructions, so that the selected custom instructions all fit in the configurable functional unit together and take less than a pipeline cycle to complete. If so determine the number of instruction cycles gained in the profile by replacing combinations of normal instructions by selected candidate custom instructions.
4) Repeat steps 1–3 for larger and smaller regions and for different selected instructions and retain the selected region and selected instructions, and retain the cluster that gains the most instruction cycles. This step may be speeded up heuristically starting from the most gainful clusters found for a region and expanding them with further custom instructions, either from the same region or from an expansion of that region.
5) Repeat steps 1–4 for different non-overlapping areas of the program, retaining respective clusters for all these different regions.

Note that the minimization is a local process, localized to regions of the program and not for the program overall. The point is that a cluster reduces the instruction cycle count for a specific region. What happens in other regions does not matter, because the cluster need not be loaded for those regions. In fact, different clusters for different regions may contain some custom instructions with identical effects. When one of these custom instructions with identical effects is executed, the region that is executed determines which one of the clusters is loaded. The configuration program that is loaded therefore determined by the region that is being executed rather than by any particular instruction that must be executed.

Selection of clusters and regions may be simplified using a number of heuristic criteria to select these points. Various criteria may be used for grouping candidates in clusters. For example:

Candidates within a common loop are grouped in the same cluster (this avoids reconfiguration overhead within loops).

Candidates that occur in a subroutine are grouped in a cluster or clusters for that subroutine.

Candidates of lower logic complexity are grouped in bigger clusters (with more candidates).

Candidates of higher logic-complexity are grouped in smaller clusters (with fewer candidates).

The synthesis of similar candidates (in terms of logic) in the same cluster should be favored, in order to better exploit logic cross-minimization opportunities.

A criterion for selecting clusters that has been found to work effectively in practice is to put custom instructions in a cluster dependent on similarity of the input bits of their operands that affect the result of the custom instruction. Given a custom instruction it is straightforward to determine which of the bits of its input operands affect its result and which do not affect the result. Dissimilarity of custom instructions can then be measured in terms of the number of non-shared input bits. Therefore clusters of custom instructions are preferably selected by computing which bits of the inputs of each instruction affect its result, these are called the "relevant bits", computing a measure of dissimilarity between instructions in terms of the number of non-shared relevant bits, and selecting clusters of custom instructions that have less than a set amount of dissimilarity.

The regular and predictable timing model of the CPLD core favors the formation of clusters. Grouping multiple candidates in a single configuration could sensibly change their implementation delay in a typical FPGA structure, making the algorithm for automatic cluster formation fairly more difficult, because in that case cross-minimization has to be performed under the constraint that it does not introduce too much delay. With the CPLD, adding more custom instructions to a given configuration simply requires more product terms (PTs) from the PAL or PLA. As long as the circuit fits in the core, the delay will be limited to the time delay through the cross-point switch and PLA (Tpd_pla), and the algorithm doesn't need to consider delay variation issues while forming clusters.

In the functional unit of FIG. 2, the cross-point switch 24 is particularly useful, because it makes it possible to bring signals for different bits of the operands together in one logic block 26a,b, even when these different bits are spread out irregularly over very different locations in the operands. This makes it possible to implement configurable instructions that would require a great many normal instructions if the same effect had to be realized with the ALU 16.

Also, the cross-point switch 24 makes it possible to mix the instruction selection bits freely with operand data bits in different blocks 26a,b. Thus, better cross-minimization of hardware resource use is possible by integrating instruction discrimination with operand processing.

What is claimed is:

1. A method of executing a computer program with a processor including a configurable functional unit capable of executing configurable instructions having an effect that are redefined at run-time by a loading of a configuration program, the method comprising the steps of:

selecting a plurality of combinations of configurable instructions;

generating a respective configuration program for each combination of configurable instructions;

executing the computer program; and each time when an instruction from one of the combinations of configurable instructions is needed during execution and the configurable functional unit is not configured with the respective configuration program for that combination of configurable instructions, triggering the configuration functional unit to load the respective configuration program for all of the configurable instructions of that combination into the configurable functional unit.

2. The method according to claim 1, wherein the step of generating the configuration programs includes cross-minimizing hardware resource use for different instructions in at least one of the configuration programs.

3. The method according to claim 2, wherein hardware resource use for selecting different instructions from the combination during program execution and for processing operand data according to the different instructions is cross-minimized.

4. The method according to claim 2, wherein the configurable functional unit contains a cross-point switch between an input for operand data and connection lines that connect respective outputs of the cross-point switch to different logical combination circuits, the cross-point switch being controlled by the configuration program, wherein programming of the connections in the cross-point switch is used to cross-minimize hardware resource use in the configurable functional unit.

5. The method according to claim 4, wherein at least part of bits for selecting the configurable instruction from the combination are applied to the cross-point switch interchangeably with the operand data.

6. A processor, comprising:
a configurable functional unit for executing configurable instructions having an effect that is redefined at run-time by loading a configuration program, said configurable functional unit including a load triggering circuit for triggering loading of the configuration program when that configuration program is not yet loaded when needed for executing a configurable instruction,
wherein the configuration program defines the effect of at least two combined configurable instructions, said load triggering circuit triggering loading of the configuration program for all of the combined configurable instructions when at least one of the combined configurable instructions is needed.

7. The processor according to claim 6,
wherein said configurable functional unit further includes
an instruction selection input for selecting an instruction from the combination,
an operand data input,
combination logic, and
a result output;
wherein the operand data input and the instruction selection inputs are both coupled to the result output via the combination logic; and
wherein the instruction selection input and operand data input are interchangeable.

8. The processor according to claim 7, wherein said configurable functional unit includes a cross-point switch between the combination logic and the operand data input and the instruction selection inputs, said cross-point switch interchangeably connecting the instruction selection input and operand data input to the combination logic functionally interchangeably.

9. The processor according to claim 6, wherein said configurable functional unit includes a programmable logic device that imparts a substantially fixed operand-result delay, irrespective of which one of a plurality of classes of possible connections that implement the configurable instructions of the combinations are connected under control of the configuration program.

10. The processor of according to claim 6,
wherein said configurable functional unit further includes a cross-point switch operable to receive a configurable instruction selection code indicative of a first configurable instruction included within the at least two combined configurable instructions.

11. The processor of according to claim 10,
wherein said configurable functional unit executes the first configurable instruction subsequent to a loading of the at least two combined configurable instructions within said configurable functional unit and subsequent to a reception of the configurable instruction selection code by said cross-point switch.

12. The processor according to claim 6,
wherein said triggering circuit is operable to receive a first portion of the configurable instruction selection code, the first portion being indicative of the at least two combined configurable instructions.

13. The processor according to claim 12,
wherein said configurable functional unit further includes a cross-point switch operable to be reprogrammed; and
wherein said triggering circuit reprograms said cross-point switch in accordance with the at least two combined configurable instructions in response to an exclusion by said triggering circuit of the at least two combined configurable instructions as indicated by the first portion of the configurable instruction selection code.

14. The processor of according to claim 13,
wherein said cross-point switch is further operable to receive a second portion of the configurable instruction selection code, the second portion being indicative of a first configurable instruction included within the at least two combined configurable instructions.

15. The processor of according to claim 14,
wherein said configurable functional unit executes the first configurable instruction subsequent to a reprogramming of said cross-point switch in accordance with the at least two combined configurable instructions and subsequent to a reception of the second portion of the configurable instruction selection code by said cross-point switch.

16. The processor according to claim 12,
wherein said configurable functional unit further includes at least one logic block operable to be reprogrammed; and
wherein said triggering circuit reprograms said at least one logic-block in accordance with the at least two combined configurable instructions in response to an exclusion by said triggering circuit of the at least two combined configurable instructions as indicated by the first portion of the configurable instruction selection code.

17. The processor of according to claim 16,
wherein configurable functional unit further includes a said cross-point switch operable to receive a second portion of the configurable instruction selection code, the second portion being indicative of a first configurable instruction included within the at least two combined configurable instructions.

18. The processor of according to claim 17,
wherein said configurable functional unit executes the first configurable instruction subsequent to a reprogramming of said at least two logic-blocks in accordance with the at least two combined configurable instructions and subsequent to a reception of the second portion of the configurable instruction selection code by said cross-point switch.

19. The processor according to claim 6,
wherein said configurable functional unit further includes means for executing a first configurable instruction included within the at least two combined configurable instructions subsequent to a loading of the at least two combined configurable instructions within said configurable functional unit.

20. A computer program product for generating machine code for a processor including configurable processing unit, the machine code including a plurality of configurable instructions, the computer program product being arranged to select a combination of configurable instructions for combined loading into the configurable processing unit, said computer program product comprising:

computer program code for determining for each of a number of configurable instructions which of bits of a plurality of input operands of the configurable instructions affect a result of the configurable instructions;

computer program code for determining a measure of dissimilarity between the configurable instructions corresponding to the number of the bits of the input operands that do not affect the result of all configurable instructions for which the measure of dissimilarity is computed; and computer program code for selecting the combination of configurable instructions on a basis of the measure of dissimilarity possible combinations with relatively less dissimilarity being preferred in the selection over possible combinations with relatively more dissimilarity.

* * * * *